United States Patent
Huang et al.

[11] Patent Number: 6,160,932
[45] Date of Patent: Dec. 12, 2000

[54] EXPANDABLE WAVELENGTH DIVISION MULTIPLEXER BASED ON INTERFEROMETRIC DEVICES

[75] Inventors: Chi-hung Huang; Joseph Chon; Sheau Sheng Chen, all of Fremont, Calif.

[73] Assignee: WaveSplitter Technologies, Inc., Fremont, Calif.

[21] Appl. No.: 09/249,899

[22] Filed: Feb. 16, 1999

[51] Int. Cl.[7] ................................... G02B 6/293
[52] U.S. Cl. ............................. 385/24; 359/124
[58] Field of Search ................. 359/115, 124–134; 385/15, 24, 31, 39, 42, 50

[56] References Cited

U.S. PATENT DOCUMENTS

| | | |
|---|---|---|
| 4,799,797 | 1/1989 | Huggins .................................. 356/345 |
| 4,866,698 | 9/1989 | Huggins et al. ............................ 370/1 |
| 5,680,490 | 10/1997 | Cohen et al. ............................. 385/24 |
| 5,852,505 | 12/1998 | Li ............................................ 359/118 |

*Primary Examiner*—John D. Lee
*Assistant Examiner*—Michelle R. Connelly-Cushwa
*Attorney, Agent, or Firm*—Skjerven Morrill MacPherson LLP; Tom Chen

[57] ABSTRACT

A wavelength division multiplexer (WDM) utilizes cascaded interferometric devices, where the two output branches of interferometric devices in each new stage are each coupled to an additional stage of interferometric devices having the same wavelength separation or channel spacing, which suppresses the sidelobes of the signals from preceding stage of interferometric devices. In one embodiment, the interferometric devices are unbalanced Mach-Zehnder Interferometers.

18 Claims, 8 Drawing Sheets

EXPANDABLE WAVELENGTH DIVISION MULTIPLEXER BASED ON INTERFEROMETRIC DEVICES

CROSS REFERENCE TO RELATED APPLICATIONS

This application is related to commonly-owned U.S. Pat. No. 5,809,190 to Chen, entitled "Apparatus and Method of Making a Fused Dense Wavelength-Division Multiplexer" and to commonly-owned U.S. patent application Ser. No. 09/034,895 to Chen, now U.S. Pat. No. 6,031,948, issued on Feb. 29, 2000, entitled "A Fused-Fiber Multi-Window Wavelength Division Multiplexer Using An Unbalanced Mach-Zehnder Interferometer and Method of Making Same, filed Mar. 3, 1998, both of which are incorporated by reference in their entirety.

BACKGROUND OF THE INVENTION

1. Field of the Invention

The present invention relates to wavelength division multiplexers (WDMs) and, in particular, to WDMs utilizing interferometric devices capable of channel separation and routing.

2. Discussion of the Related Art

With existing fiber optic networks, there is often the need to increase information transmission capacity. However, both physical and economic constraints can limit the feasibility of increasing transmission capacity. For example, installing additional fiber optic cable to support additional signal channels can be cost prohibitive, and electronic system components may impose physical limitations on the speed of information that can be transmitted. The use of wavelength division multiplexers (WDMs) provides a simple and economical way to increase the transmission capacity of fiber optic communication systems by allowing multiple carrier wavelengths (channels) to be transmitted and received over a single optical fiber through signal wavelength multiplexing and demultiplexing. In addition, WDMs can be used in fiber optic communication systems for other purposes, such as dispersion compensation, noise reduction, and gain flatting, i.e., maintaining a uniform gain within the usable bandwidth for erbium-doped amplifiers.

WDMs can be manufactured using, for example, biconical tapered fusion (BTF) technology. Typically, two optical fibers are fused together along an interior portion to form a fused-fiber coupler, so that light of two wavelengths (e.g., 1310 nm and 1550 nm) entering the input terminals of the first and second fibers, respectively, are multiplexed onto a single fiber. The coupling ratios for the two channels (the signals at 1310 nm and 1550 nm) exhibit complementary sinusoidal behavior for amplitude as a function of frequency within the passband of the WDM, with each channel having one or more peaks (or windows) within the passband. Information carried by the two signals along the single fiber is then demultiplexed at the WDM outputs.

Multi-window WDMs (MWDMs) have two or more peaks of amplitude as a function of frequency (or operational windows) for each channel within a passband. MWDMs can also be made using BTF technology by twisting two optical fibers together, fusing the center portion together, and pulling the fibers until a desired multi-window transmission spectrum appears at a monitored fiber output terminal. Such a long-tapered-fusing technology is discussed in commonly-owned U.S. Pat. No. 5,809,190 referenced above.

Even though optical fibers have high information carrying capacity, the overall optical communication link may be restricted by practical bandwidth considerations, thereby limiting the size of passbands. Therefore, to increase the efficiency of bandwidth use, the passband should contain as many communication channels or windows as possible, subject to constraints with the system. WDMs have interferometric devices at the input of the communication system to combine (multiplex) the wavelengths of multiple optical signals into a single carrier signal for transmission, and interferometric devices at the system output to separate (demultiplex) the wavelengths back to individual signal streams. Suitable interferometric devices are ones having the wavelength combination/separation and routing capabilities, such as Mach-Zehnder Interferometers (MZIs), couplers, fiber gratings, and array waveguides.

The wavelengths of the various channels in the useable bandwidth are filtered to pass the desired wavelengths and reject signals outside the wavelength peaks. To increase the number of channels or windows, the bandwidth of each channel or window and/or the separation between wavelength peaks should be minimized. However, associated with each wavelength peak are sidelobes on either side of the peak. These sidelobes can be significant in power, and if the channel separation is small, the sidelobes of adjacent and neighboring channels can cause significant cross-talk between pass and stop channels. As a result, communication quality and channel selectivity for the system is degraded.

Accordingly, it is desired to have a wavelength division multiplexer that is capable of suppressing sidelobes in a multi-channel spectrum.

SUMMARY OF THE INVENTION

The present invention provides a wavelength division multiplexer (WDM) having cascaded interferometric devices, where each of the two output branches of the interferometric device(s) in a new demultiplexed stage are coupled to another interferometric device having the same channel separation or window spacing.

In accordance with one embodiment of the present invention, each of the two output branches of a first unbalanced Mach-Zehnder Interferometer (MZI) having wavelength separation capability of $\Delta\lambda$ is coupled to an input branch of one of two second MZIs, also having wavelength separation capability of $\Delta\lambda$, thereby forming a 1×2 WDM. Other types of interferometric devices having channel separating/combining and/or periodic routing capabilities, such as, but not limited to, couplers, fiber gratings, array waveguides, and Michelson Interferometers can also be used. The resulting output signal from each of the two second MZIs has lower sidelobe powers than the signals from the first MZI because the signal processed through the two second MZIs with approximately the same transmission function as the preceding MZI, which, on a logarithmic or dB scale, essentially doubles the amount of sidelobe suppression. Consequently, cross-talk is reduced between pass and stop channels. This type of cascading can continue. For example, the output signal from each of the two second MZIs can be coupled to an input branch of two third MZIs having wavelength separation capability of 2 $\Delta\lambda$. Each of the two output branches from the two third MZIs is coupled to an input branch of one of four fourth MZIs having the same wavelength separation capability as the preceding third MZIs, i.e., 2 $\Delta\lambda$, thereby forming a 1×4 WDM. (The stages of the second, fourth, etc. MZIs are generally referred to herein as redundancy stages.) Preferably, the cascading is stopped before the signal into the first MZI has been fully demultiplexed. The smaller WDMs can be utilized by themselves or combined to form larger WDMs, thereby providing more flexibility to the user. For example, the 1×4 WDM described above can be combined with four more 1×4 WDMs to form a 1×16 WDM. This invention can also be used where cross-talk is not an important system parameter, such as with systems utilizing signal multiplexers or combiners, for example.

In other embodiments, the redundancy stages can be removed from the WDMs described above. This will increase the cross-talk between channels because of increased sidelobes from adjacent and neighboring channels. However, the size and cost of the WDMs will decrease.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

The present invention provides a wavelength division multiplexer (WDM) utilizing cascaded interferometric devices, where the two output branches of interferometric devices in each new stage are each coupled to an additional stage of interferometric devices having the same wavelength separation or channel spacing, which suppresses the sidelobes of the signals from preceding stage of interferometric devices.

Figure 1:
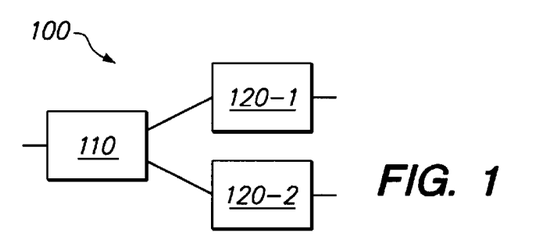
FIG. 1 shows a 1×2 WDM according to one aspect of the present invention.

FIG. 1 is a general block diagram of a 1×2 WDM 100 according to one aspect of the present invention. WDM 100 includes a first stage having a first interferometric device 110 with a wavelength separation or channel spacing of $\Delta\lambda$. Each of the two output branches of device 110 are coupled to an input branch of one of two second interferometric devices 120-1 and 120-2 in a second stage, with both devices 120-1 and 120-2 having the same wavelength separation as the first device in the first stage (i.e., $\Delta\lambda$). The resulting signals from device 120-1 and 120-2 in the second stage (also referred to herein as a redundancy stage) have lower sidelobes than the signals at the output branches of device 110. The sidelobe suppression occurs because the redundancy stages have the same wavelength separation with similar transmission functions as the preceding stage(s), which essentially doubles the amount of sidelobe suppression (on a logarithmic or dB scale).

The 1×2 WDM 100 of FIG. 1 can be utilized as its own separate device or WDM 100 can be cascaded with other 1×2 WDMs to form larger WDMs, such as 1×4, 1×16, 1×32, and larger WDMs. In another embodiment, shown in FIG. 2, an individual 1×4 WDM 200 can be formed with three 1×2 WDMs 100 of FIG. 1. Each of the two output branches of devices 120-1 and 120-2 of FIG. 1 (having channel spacing of $\Delta\lambda$) is coupled to an input of one of two third interferometric devices 130-1 and 130-2 in a third stage, both devices 130-1 and 130-2 having a wavelength separation of 2 $\Delta\lambda$. The two output branches of device 130-1 are coupled to input branches of two of four fourth interferometric devices 140-1 and 140-2 in a fourth stage having the same wavelength separation as the devices in the third stage (i.e., 2 $\Delta\lambda$). Similarly, the two output branches of device 130-2 are coupled to input branches of the other two of the four fourth interferometric devices 140-3 and 140-4, also having wavelength separation of 2 $\Delta\lambda$. Thus, the fourth stage is another redundancy stage, which further suppresses the sidelobes and reduces the cross-talk from pass and stop channels.

Figure 2:
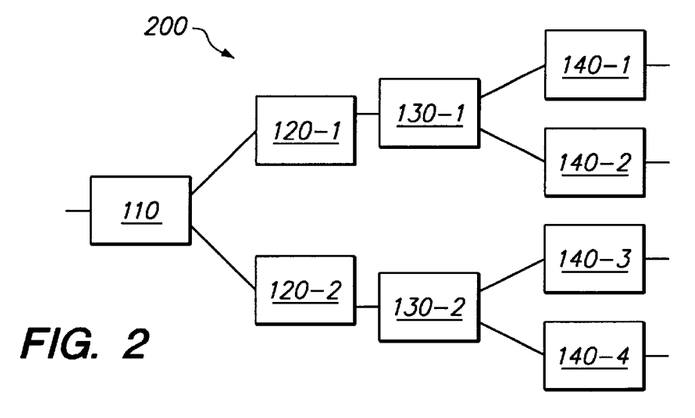
FIG. 2 shows a 1×4 WDM according to another aspect of the present invention.

The interferometric devices of FIGS. 1 and 2 are preferably unbalanced Mach-Zehnder Interferometers (MZIs), which will be described below. However, other types of interferometric devices that are capable of wavelength separating/combining and/or periodic routing are also suitable for the present invention, such as, but not limited to, couplers, fiber gratings, array waveguides, and Michelson Interferometers.

The WDMs of FIGS. 1 and 2 can be expanded to completely demultiplex a particular input signal, or more preferably, the WDM can be constructed to separate output signals that have not been fully demultiplexed. For example, for WDM 200 of FIG. 2, MZIs 110, 120-1, and 120-2 can have wavelength separation capabilities of 0.8 nm ($\Delta\lambda$), and MZIs 130-1, 130-2, and 140-1 to 140-4 can have wavelength separation capabilities of 1.6 nm (2 $\Delta\lambda$). The resulting is then a 1×4 100 GHz DWDM. The input signal has sixteen carrier components or channels between 1447.72 nm to 1559.79 nm with a channel separation between each of 0.8 nm or 100 GHz. The output of WDM 200 is four groups of signals containing four signal components each. The output of MZI 140-1 is a signal containing wavelengths of 1547.72 nm, 1550.92 nm, 1554.13 nm, and 1557.36 nm, for a channel separation of approximately 3.2 nm or 400 GHz. Other wavelength groupings of four at 3.2 nm separations are output from MZIs 140-2 to 140-4. The resulting signals from MZIs 140-1 to 140-2 can then be further demultiplexed by additional 1×4 DWDMs. These additional DWDMs can be 1×4 100 GHz DWDMs, such as shown in FIG. 2 or 1×4 400 GHz DWDMs, such as described in commonly-owned U.S. Pat. No. 5,809,190, referenced above.

Figure 3:
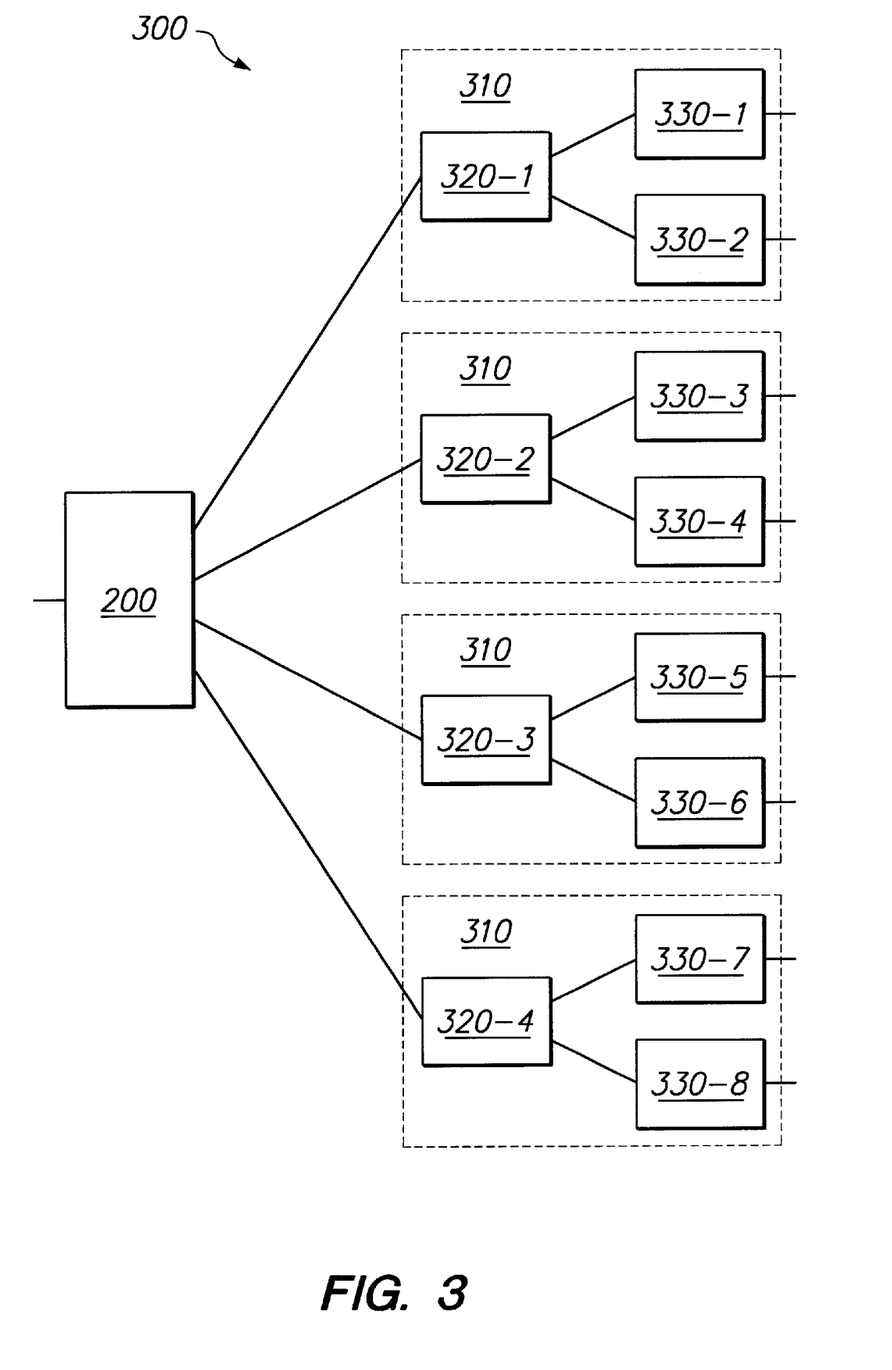
FIG. 3 shows a 1×16 WDM according to one aspect of the present invention.
Figure 4:
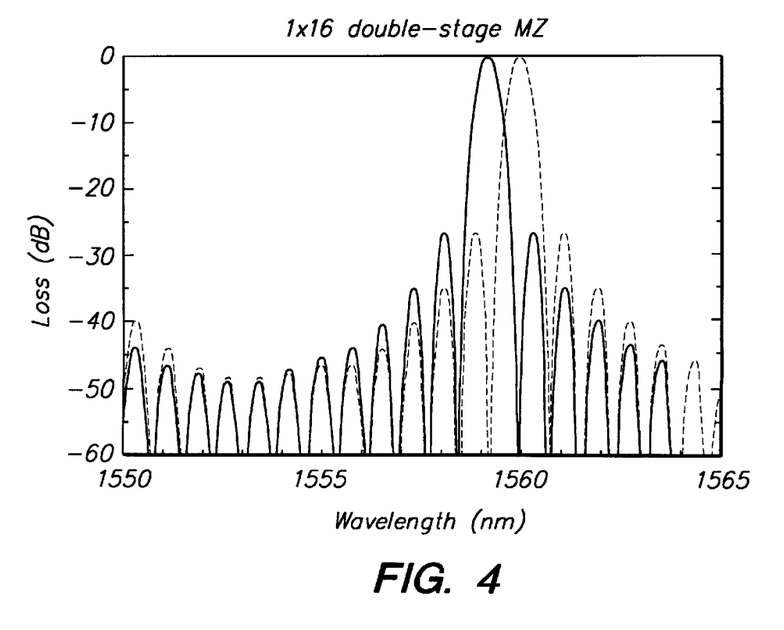
FIGS. 4–6 show plots of various outputs of the WDMs according to the present invention.

FIG. 3 shows a 1×16 DWDM 300 formed from one 1×4 100 GHz DWDM 200 of FIG. 2 and four 1×4 400 GHz DWDMs 310. The structure of DWDMs 310 is similar to that of DWDM 200 of FIG. 2, with the exception that the redundancy stages are omitted, i.e., MZIs 120-1 and 120-2 with channel spacing Δλ and MZIs 140-1 to 140-4 with channel spacing 2 Δλ are excluded. Thus, each of DWDMs 310 is formed from one MZI 320 with channel spacing Δλ and two MZIs 330 with channel spacing 2 Δλ. FIG. 4 shows the spectrum of two signals from the 1×16 DWDM 300 of FIG. 3. The solid and dashed curves represent adjacent channels (i.e., separated by approximately 0.8 nm or 100 GHz). As seen, the cross-talk between the two adjacent channels less than −20 dB, due to the sidelobe suppression from the redundancy stages of DWDM 200.

Figure 5:
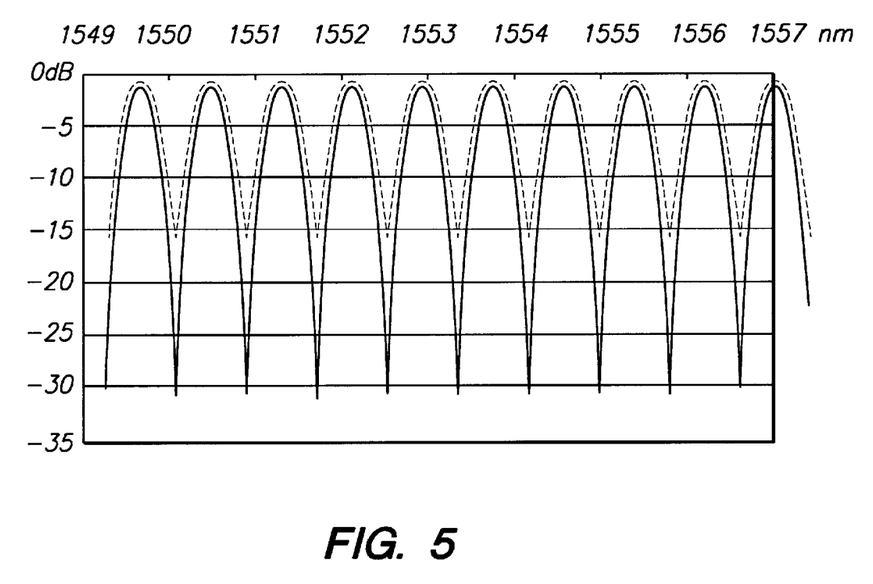
Figure 6:
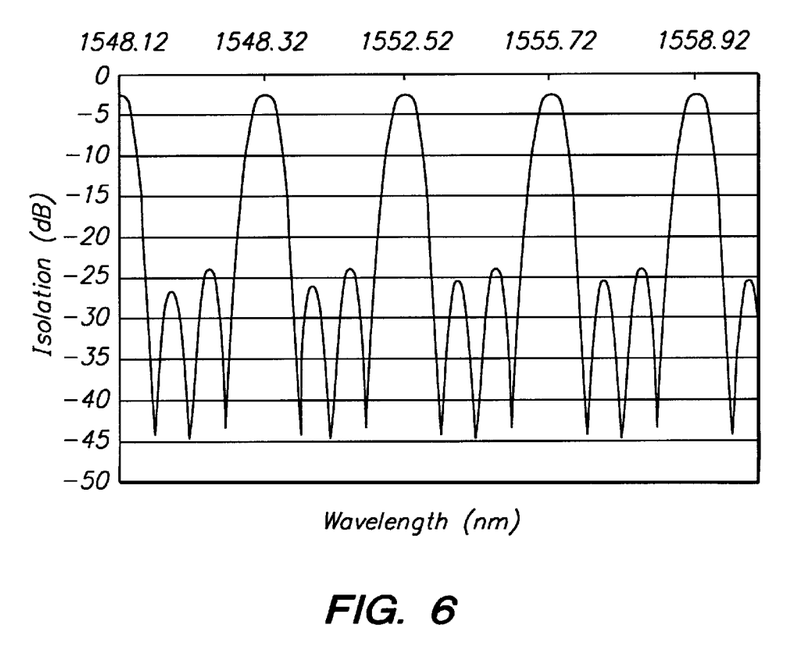

FIGS. 5 and 6 are additional plots showing advantages of the present invention. FIG. 5 shows a comparison of the isolation improvement when using the WDM with and without the redundancy stage. Referring also to FIG. 2, the dashed curve represents the signal at an output branch of interferometric device (e.g., MZI) 110, while the solid curve represents the signal at the output branch of interferometric device (e.g., MZI) 120-1. Thus, without the redundancy stage, sidelobe suppression is down about 15 dB, while with the redundancy stage, sidelobes are suppressed down to about 30 dB or double that of the previous stage. In FIG. 6, the signal is taken at an output of the WDM 200 of FIG. 2, e.g., the output terminal of MZI 140-2 in the second redundancy stage. As seen in FIG. 6, both the cross-talk and isolation are down greater than 40 dB. Thus, with the use of expandable WDMs with redundancy stages for sidelobe suppression, WDMs can be formed which provide improved performance and flexibility for the user.

Figures 7, 8A:
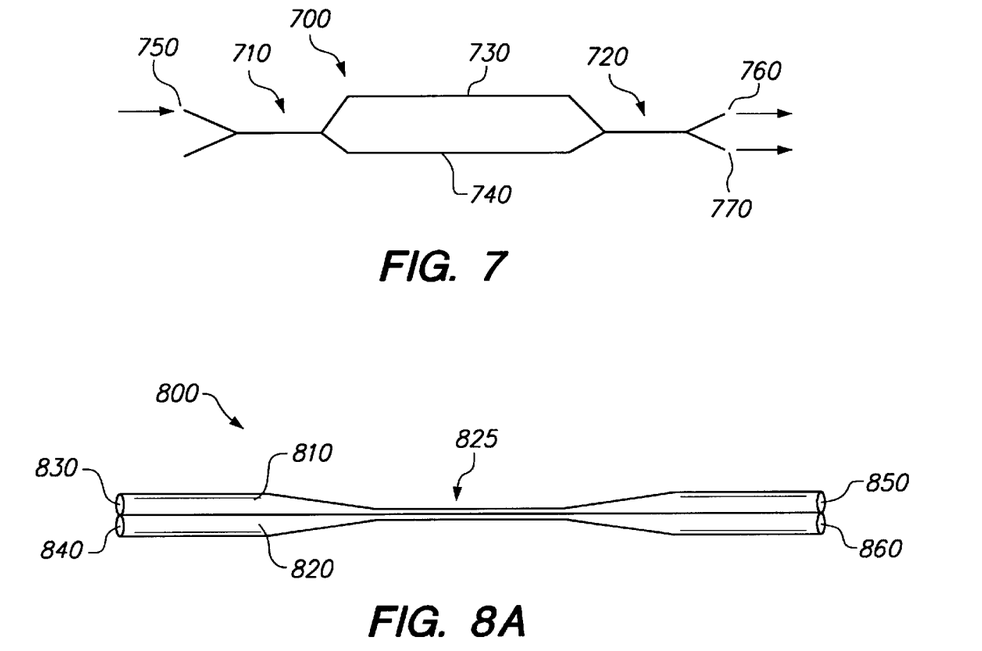
FIG. 7 shows an unbalanced Mach-Zehnder Interferometer (MZI) according to the present invention.
FIG. 8A shows the fused-fiber coupler for use with the MZI of FIG. 7.
Figure 8B:
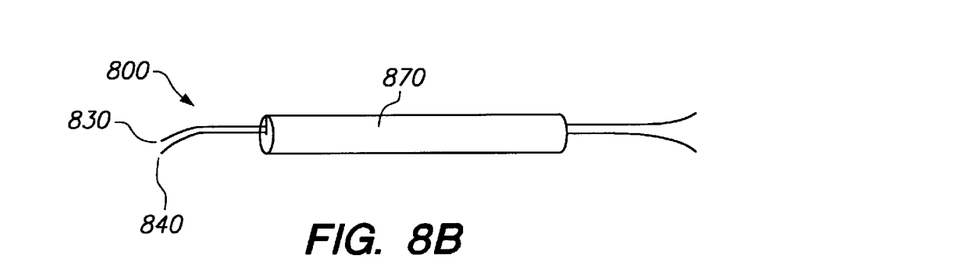
FIG. 8B shows the fused-fiber coupler of FIG. 8A mounted in a quartz sleeve.
Figure 8C:
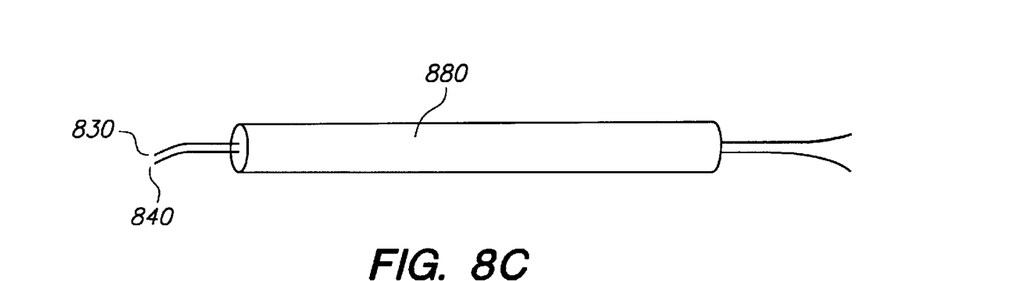
FIG. 8C shows the coupler and sleeve of FIG. 8B enclosed in a protective package.

FIG. 7 shows an unbalanced MZI 700 according to the present invention, which uses identical first and second fused-fiber couplers 710 and 720, cascaded together by optically connecting fibers 730 and 740 having different optical path lengths. Couplers 710 and 720 are typically 3-dB couplers, which divide the power entering an input terminal 750 equally between two output terminals 760 and 770. Couplers 710 and 720 are typically formed by biconical tapered fusion (BTF) technology. FIGS. 8A–8C show a typical fused-fiber coupler 800, similar to couplers 710 and 720. In FIG. 8A, fused-fiber coupler 800 can be formed by heating and axially stretching two optic fibers 810 and 820 to form a coupling region 825. Broadband light at two wavelengths, entering coupler 800 at input terminals 825 and 840, couple onto and travel along fused coupling region 830, and then decouple and exit coupler 800 at output terminals 850 and 860, respectively.

To provide mechanical protection, as well as thermal stabilization, coupler 800 is typically placed or secured within a quartz sleeve substrate 870, as shown in FIG. 8B. Thermal stabilization is achieved because quartz has a thermal expansion coefficient similar to that of the silica fiber. Coupler 800 and quartz sleeve 870 can then be placed inside a sealed package 880, typically metal, to increase mechanical and humidity protection for the fused-fiber coupler, as shown in FIG. 8C.

Referring back to FIG. 7, because of the different optical path lengths between the two couplers 710 and 720, which result in the two optical signals arriving at the coupler 720 at different times, optical signals propagating through the connecting fibers are phase-shifted. If the actual lengths of the connecting fibers differ, the phase shift is due to one signal traveling further than the other signal, and if the refractive indexes of the connecting fibers differ, the phase shift is due to the two signals traveling at different phase velocities through the connecting fibers. If both the lengths and refractive indexes of the connecting fibers differ, the phase shift is due to contributions from both effects, which may increase or decrease the phase shift depending on whether the length difference in one fiber compensates for or contributes to the phase shift due to the refractive index difference between the two fibers, and vice versa.

Figure 9:
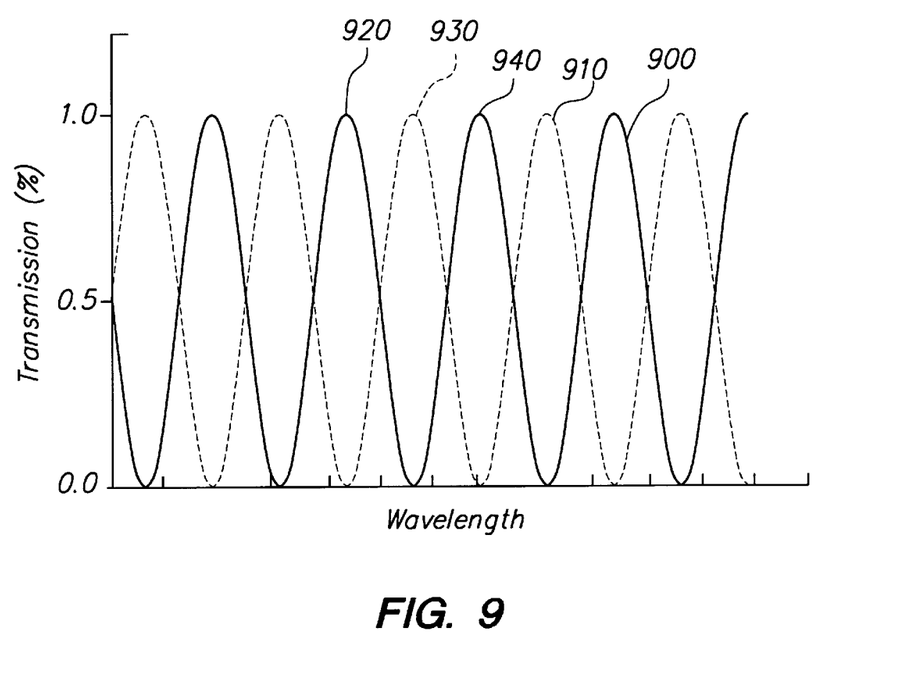
FIG. 9 shows a typical transmission spectra from the two output terminals of the MZI of FIG. 7.

FIG. 9 shows the transmission spectrum from output terminals 760 and 770, which consists of alternating peaks and nulls. Due to the optical path length difference between the two connecting fibers 730 and 740, different constructive and destructive interference occurs at different wavelengths, resulting in the spectrum of FIG. 9. Solid line 900 represents the amplitude as a function of frequency of the output signal from one transmission channel (e.g., output terminal 760), while dashed line 910 represents the amplitude as a function of frequency for the simultaneous output signal from the other transmission channel (e.g., output terminal 770).

The channel spacing Δλ of the MZI, defined as the wavelength separation between the transmission peak wavelengths of two adjacent channels, as shown, for example, by the separation of peaks 920 and 930, can be expressed by equation 1 as follows:

$$\Delta\lambda = \frac{\lambda^2}{2(n_1 l_1 - n_2 l_2)} \qquad (1)$$

where λ is the central wavelength, and $n_1$ and $n_2$ are the respective refractive indexes and $l_1$ and $l_2$ are the respective lengths of the two connecting fibers 730 and 740 of FIG. 7. The window spacing of the MZI, which is normally twice the channel spacing, is defined by the wavelength separation between two adjacent transmission peak wavelengths from a channel, as shown, for example, by the separation of peaks 920 and 940. The wavelength separation (or combination) capability of the MZI depends on the number of windows and the window spacing of the MZI.

Figure 10A:
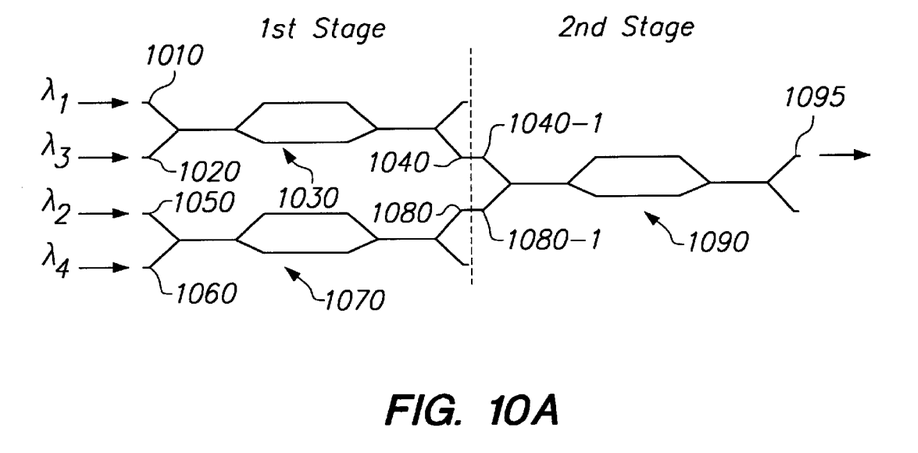
FIG. 10A shows cascading MZIs in a plurality of stages.
Figure 10B:
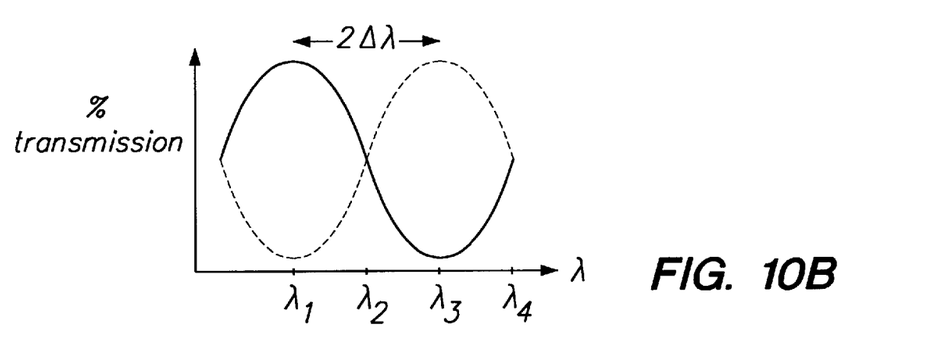
FIGS. 10B–10D show various output spectrums at the two stages in FIG. 10A.
Figure 10C:
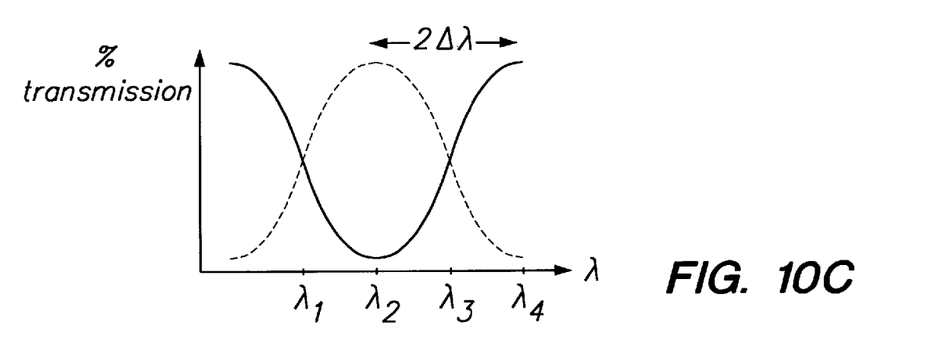
Figure 10D:
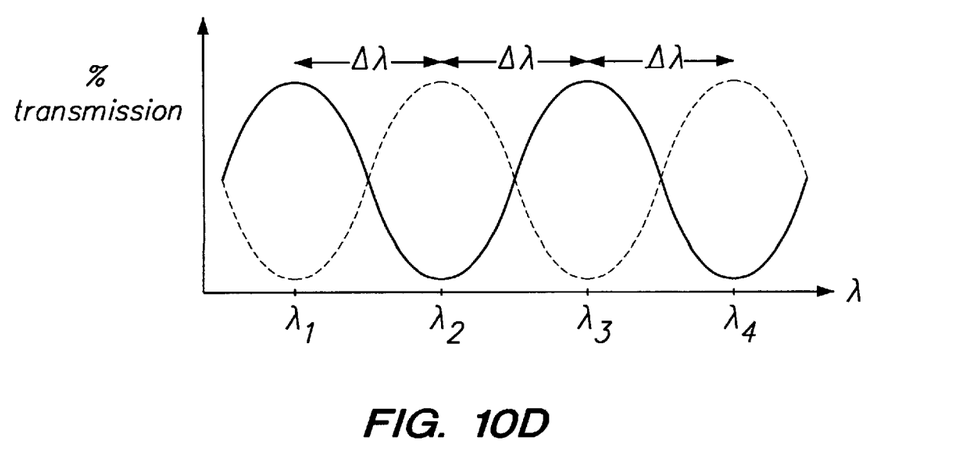

For a given usable bandwidth, the number of channels propagating through a single fiber can be increased by cascading MZIs, as disclosed in commonly-owned U.S. Pat. No. 5,809,190, incorporated by reference above. FIG. 10A shows an example of a 4×1 (or 1×4) wavelength division multiplexer (WDM). In FIG. 10A, three MZIs are cascaded to form two stages, which couple signals at four wavelengths onto a single line. Signals at wavelengths $\lambda_1$ and $\lambda_3$ entering terminals 1010 and 1020, respectively, of an MZI 1030 in the first stage are coupled and transmitted to exit terminal 1040 of MZI 1030 with a wavelength separation or channel spacing of 2 Δλ, as shown in FIG. 10B. Similarly, signals at wavelengths $\lambda_2$ and $\lambda_4$ entering terminals 1050 and 1060, respectively, of MZI 1070 in the first stage are coupled and transmitted to exit terminal 1080 of MZI 1070 with a channel separation of 2 Δλ, as shown in FIG. 10C. Note that MZIs 1030 and 1070 have wavelength separation capability of 2 Δλ. The output signals within the usable bandwidth from terminals 1040 and 1080, shown in FIGS. 10B and 10C, respectively, then enter terminals 1040-1 and 1080-1 of a MZI 1090 in the second stage. The four signals are coupled by MZI 1090, with an output spectrum shown in FIG. 10D, and exit at terminal 1095. The wavelength separation is now Δλ between all channels within the usable bandwidth. Note that MZI 1090 has a wavelength separation capability of Δλ.

The multiplexed signal can then be demultiplexed to separate the signals into four separate channels at a receiving device. For example, the device of FIG. 10A can be reversed to form a demultiplexer, such that the signal, represented by FIG. 10D, enters terminal 1095 of MZI 1090 and is decoupled into four separate signals exiting at terminals 1010, 1020, 1030, and 1040 with a spacing of 2 Δλ.

Although only two cascaded stages are shown, more channels can be coupled by cascading additional stages of MZIs, which progressively decreases the channel spacing. A more recent extension of WDM, known as dense WDM (DWDM), seeks to increase data transmission capability by coupling additional discrete wavelengths or channels onto a single fiber. Fused-fiber DWDMs may couple, for example, 8, 16, or even 32 discrete communication channels onto a single optic fiber. Thus, by cascading unbalanced MZIs in a plurality of stages and precisely adjusting the optical path lengths (described below) of the connecting fibers, the desired interference state can be obtained for DWDM applications requiring narrow channel spacing.

Referring back to FIG. 7, unbalanced MZI 700 consists of first coupler 710 and second coupler 720, joined by connecting fibers 730 and 740. Couplers 710 and 720 are made according to conventional BTF technology. Connecting the couplers to achieve different optical path lengths can be accomplished by differing the refractive indexes and/or the actual lengths of the fibers.

Figure 11A:
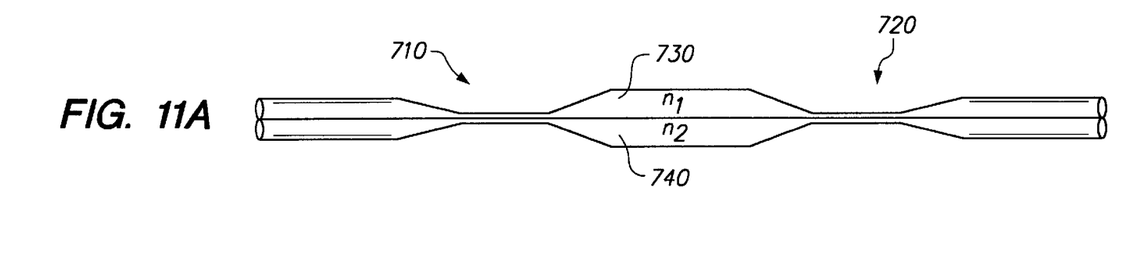
FIGS. 11A and 11B show different embodiments of a MZI according to the present invention.
Figure 11B:
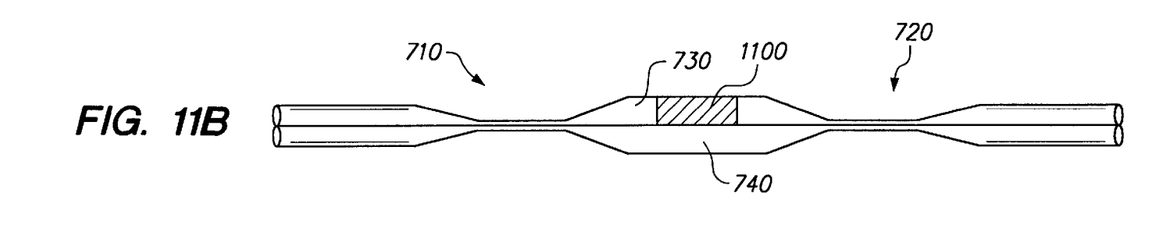

If connecting fibers having the same length are used, different optical path lengths can be obtained by fabricating first and second couplers 710 and 720 with connecting fibers 730 and 740 of different refractive indexes, as shown in FIG. 11A. In other embodiments, first and second couplers 710 and 720 are formed using connecting fibers having only portion(s) with different refractive indexes, as shown in FIG. 11B. For example, a predetermined length (dependent on the desired channel spacing) of fiber 1100 having a refractive index $n_1$ can be conventionally fuse-spliced between an undoped or normal connecting fiber 730. First and second couplers 710 and 720 are then fabricated using this fiber (fiber 1100 fuse-spliced between fiber 730) and normal connecting fiber 740. The refractive index $n_1$ is different than the refractive index $n_2$ of the normal fiber to obtain an optical path length difference, given by $(n_1-n_2)*l$, which results in a wavelength separation of $$\Delta\lambda = \frac{\lambda^2}{2(n_1 - n_2)l} \quad (2)$$

where λ is the central wavelength, $n_1$ and $n_2$ are the respective refractive indexes of fibers 1100 and 740, and l is the length of fiber 1100.

Figure 11C:
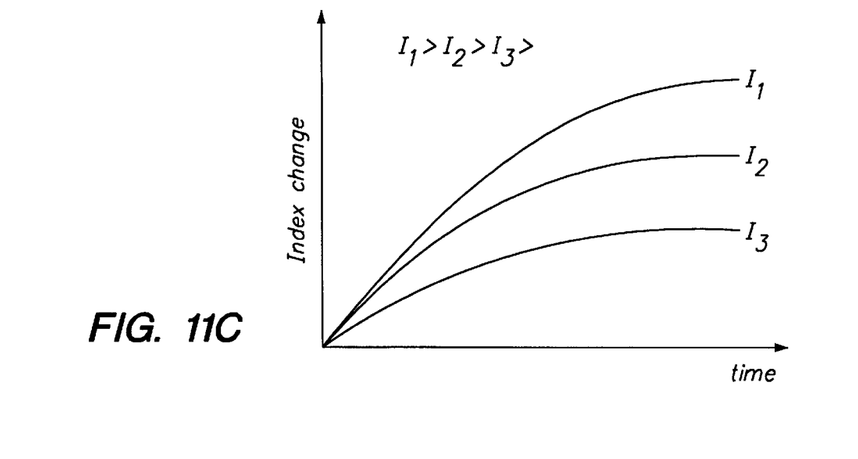
FIG. 11C shows a general relationship between the change in refractive index and the length and intensity of UV exposure.

In other embodiments, one of connecting fibers 730 or 740 of FIG. 11A or fiber 1100 of FIG. 11B can be made refractive index-sensitive to UV radiation, i.e., by using hydrogen-loaded or Ge-doped fiber. Connecting fibers 730 and 740 are then exposed to UV radiation, for example, at a wavelength between 150 and 300 nm. Because the refractive index of only one connecting fiber changes from the UV radiation, an optical path length difference can be created between the two connecting fibers. Consequently, by changing the UV intensity and exposure time, which changes the difference between the refractive indexes, the window spacing and the passband wavelength can be precisely controlled according to equation (2) above. FIG. 11C shows a general relationship between the change of refractive index as a function of UV exposure time for various UV intensities. Note that, in general, the longer the UV intensity and/or exposure time, the more the refractive index changes. In other embodiments, both connecting fibers can be doped or loaded at different levels as long as the refractive index of one fiber is more UV radiation sensitive than the other.

If the optical path difference is to be accomplished through differing the actual length of the connecting fibers, as shown in FIG. 7, the MZI can be fabricated using the same type of fiber for both connecting fibers. The path length difference can then be expressed as $n*(l_1-l_2)$, where n is the refractive index of the connecting fibers and $l_1$ and $l_2$ are the respective lengths of the two connecting fibers. First coupler 710 is made, for example, with connecting fiber 730 longer than connecting fiber 740. This length difference is preserved during the fabrication of second coupler 720. As the coupling region of second coupler 720 is being fused, light is applied to input terminal 750 and the resulting signal at output terminal 760 or 770 is monitored, for example, by an optical spectrum analyzer. The coupling region is pulled, using well-known methods, until the nulls of the monitored interference pattern reach a minimum, as shown in FIG. 9.

The path length difference can be changed by heating the connecting fibers and pulling to lengthen the connecting fiber 730 or 740. By precisely changing the actual lengths of connecting fibers 730 and 740, the desired channel spacing and passband wavelength can be obtained for specific DWDM applications by monitoring the output spectrum, e.g., with an optical spectrum analyzer.

After the desired channel spacing and passband wavelength is obtained, the MZI can be secured to various types of substrates for thermal compensation, such as disclosed in commonly-owned U.S. patent application Ser. No. 08/962, 862, entitled "Thermal Compensated Fused-fiber Dense Wavelength Division Multiplexer", filed Nov. 3, 1997, now U.S. Pat. No. 6,081,641 issued on Jun. 27, 2000, and incorporated by reference herein in its entirety. As disclosed in the above-referenced application, either the connecting fibers or the MWDM can be mounted on a composite substrate such that as temperature increases, the composite substrate expands to decrease the tension on the connecting fibers, which shifts the wavelength in a direction opposite from the temperature-induced wavelength shift.

Figure 12:
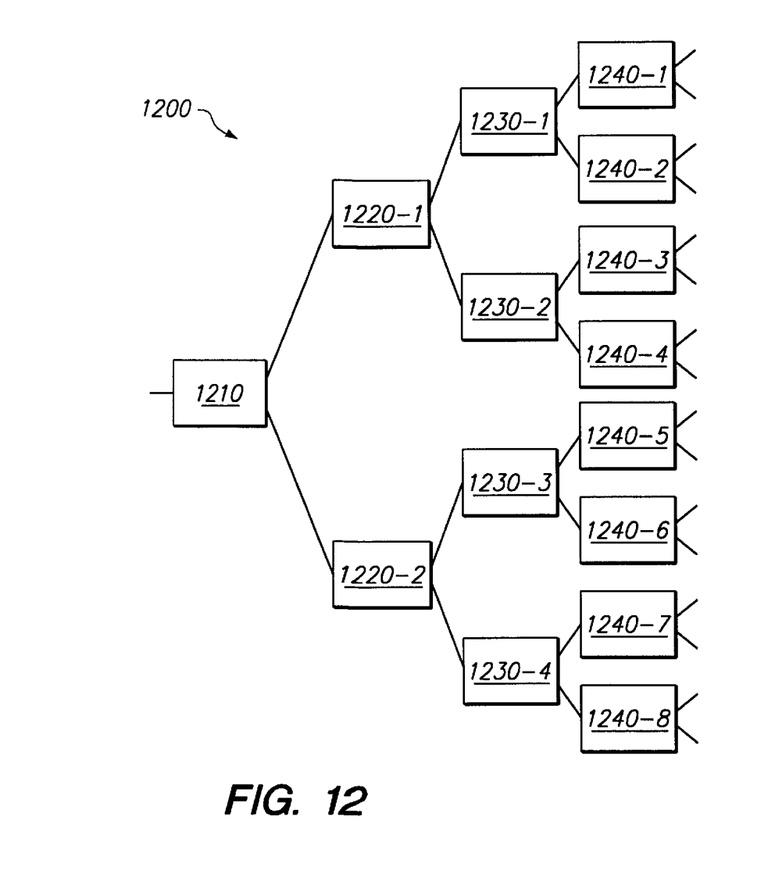
FIG. 12 shows a cascaded WDM having multiple MZIs.

With or without the thermal compensation, the WDM of FIG. 10A, as described above, can be extended to a 1×16 DWDM 1200 by cascading additional MZIs, as shown in FIG. 12. A multiplexed input signal having sixteen signal components or carrier wavelengths with each channel separated by Δλ is input to a MZI 1210 with a wavelength separation capability of Δλ, similar to that of FIG. 7. One output branch contains signals at wavelengths $\lambda_1, \lambda_3, \lambda_5, \lambda_7, \lambda_9, \lambda_{11}, \lambda_{13}$, and $\lambda_{15}$, and the other output branch of MZI 1210 contains signals at wavelengths $\lambda_2, \lambda_4, \lambda_6, \lambda_8, \lambda_{10}, \lambda_{12}, \lambda_{14}$, and $\lambda_{16}$. The two output branches are then input to MZIs 1220-1 and 1220-2 with a channel separation of 2 Δλ. The output signal from one branch of MZI 1220-1 contains signals at wavelengths $\lambda_1, \lambda_5, \lambda_9$, and $\lambda_{13}$, and the other output signal contains signals at wavelengths $\lambda_3, \lambda_7, \lambda_{11}$, and $\lambda_{15}$. The output signal from one branch of MZI 1220-2 contains signals at wavelengths $\lambda_2, \lambda_6, \lambda_{10}$, and $\lambda_{14}$, and the other output signal contains signals at wavelengths $\lambda_4, \lambda_8, \lambda_{12}$, and $\lambda_{16}$. This demultiplexing continues until the input signal from MZI 1210 is demultiplexed into sixteen individual signals from MZIs 1240-8 to 1240-8, each having a channel spacing of 8 Δλ.

Figure 13:
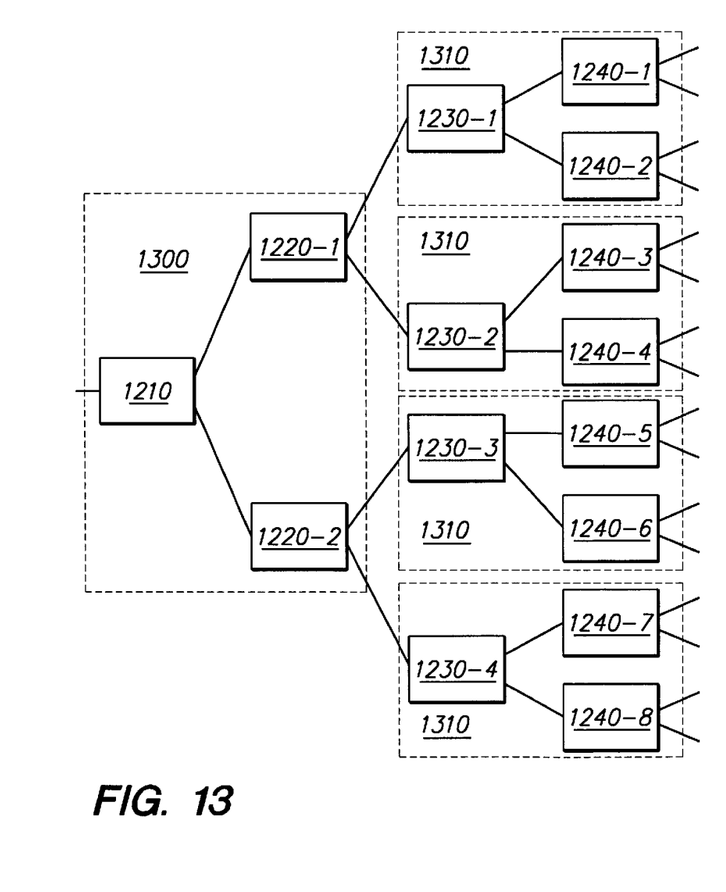
FIG. 13 shows the WDM of FIG. 12 grouped into separate units.

To make the WDM of FIG. 12 more flexible, the various MZIs can be grouped as separate units, such as shown in FIG. 13. MZIs 1210 and 1220-1 and 1220-2 can be grouped and packaged as a separate device 1300. Thus, device 1300 is a 1×4 DWDM with wavelength separation capability of 2 Δλ at the output. In addition, four 1×4 DWDMs 1310 with wavelength separation capability of 8 Δλ at the output are formed -from groupings of MZIs 1230-1, 1240-1, and 1240-2, MZIs 1230-2, 1240-3, and 1240-4, MZIs 1230-3, 1240-5, and 1240-6, and MZIs 1230-4, 1240-7, and 1240-8, as shown. The separate DWDMs can be used separately or combined to allow larger DWDMs to be formed by simply cascading additional DWDMs according to the desired wavelength separation capabilities. Also, by having separate DWDM units, the user is capable of a wider variety of options for demultiplexing and/or multiplexing and routing of the signals. In particular, sixteen individual signals input to MZIs 1240-1 to 1240-8 can be multiplexed onto a single signal at the output of MZI 1210.

The above-described embodiments of the present invention are merely meant to be illustrative and not limiting. It will thus be obvious to those skilled in the art that various changes and modifications may be made without departing from this invention in its broader aspects. For example, unbalanced MZIs used to describe the WDMs, any interferometric device having channel separating/combining and/or periodic routing capabilities are suitable for the present invention. In addition, the redundancy stages described above can also be formed from 1×1 devices, such as filters or other suitable devices, and not necessarily WDMs. Therefore, the appended claims encompass all such changes and modifications as fall within the true spirit and scope of this invention.

We claim:

1. A wavelength division multiplexer (WDM) device, comprising:
   a first interferometric device having a wavelength separation capability of $\Delta\lambda$;
   a second device coupled to a first output of said first interferometric device, wherein said second device has a wavelength separation capability of $\Delta\lambda$; and
   a third device coupled to a second output of said first interferometric device, wherein said third device has a wavelength separation capability of $\Delta\lambda$.

2. The WDM of claim 1, wherein said second and third devices are interferometric devices, and wherein said first, second, and third devices are devices capable of periodic routing of wavelengths.

3. The WDM of claim 2, wherein said first, second, and third interferometric devices are Mach-Zehnder Interferometers (MZIs).

4. The WDM of claim 3, wherein said MZI comprises:
   a first fused-fiber coupler;
   a second fused-fiber coupler;
   a first connecting fiber connecting a first output terminal of said first coupler to a first input terminal of said second coupler;
   a second connecting fiber connecting a second output terminal of said first coupler to a second input terminal of said second coupler, wherein said second connecting fiber has an optical path length different than said first connecting fiber; and
   a substrate securing said first and second couplers.

5. The WDM of claim 4, wherein said first and second connecting fibers have different refractive indexes only in portions of said first and second connecting fibers.

6. The WDM of claim 4, wherein the refractive indexes of said first and second connecting fibers have different sensitivities to UV light.

7. The WDM of claim 2, wherein said first, second, and third interferometric devices are selected from a group consisting of Michelson Interferometers, couplers, fiber gratings, array waveguides, and any other periodic interferometric devices.

8. The WDM of claim 2, wherein said first, second, and third interferometric devices form a single device.

9. The WDM of claim 2, further comprising:
   a fourth interferometric device coupled to an output of said second interferometric device, wherein said fourth interferometric device has a wavelength separation capability of 2 $\Delta\lambda$;
   a fifth interferometric device coupled to an output of said third interferometric device, wherein said fifth interferometric device has a wavelength separation capability of 2 $\Delta\lambda$;
   a sixth interferometric device coupled to a first output of said fourth interferometric device, wherein said sixth interferometric device has a wavelength separation capability of 2 $\Delta\lambda$;
   a seventh interferometric device coupled to a second output of said fourth interferometric device, wherein said seventh interferometric device has a wavelength separation capability of 2 $\Delta\lambda$;
   an eighth interferometric device coupled to a first output of said fifth interferometric device, wherein said eighth interferometric device has a wavelength separation capability of 2 $\Delta\lambda$; and
   a ninth interferometric device coupled to a second output of said fifth interferometric device, wherein said ninth interferometric device has a wavelength separation capability of 2 $\Delta\lambda$.

10. The WDM of claim 9, wherein said first, second, third, fourth, fifth, sixth, seventh, eighth, and ninth interferometric devices form a single device.

11. The WDM of claim 1, wherein a signal entering said first interferometric device contains more than two channels.

12. A method of making a wavelength division multiplexer (WDM) device, comprising:
    connecting a first output terminal of a first interferometric device having a wavelength separation capability of $\Delta\lambda$ to an input terminal of a second interferometric device having the same wavelength separation capability as said first interferometric device; and
    connecting a second output terminal of said first interferometric device to an input terminal of a third interferometric device having the same wavelength separation capability as said first interferometric device.

13. The method of claim 12, wherein said first, second, and third interferometric devices are devices capable of periodic routing of wavelengths.

14. The method of claim 12, wherein said first, second, and third interferometric devices are Mach-Zehnder Interferometers (MZIs).

15. The method of claim 12, wherein said first, second, and third interferometric devices are selected from a group consisting of Michelson Interferometers, couplers, fiber gratings, array waveguides, and any other periodic interferometric devices.

16. The method of claim 12, further comprising forming a single 1×2 WDM from said first, second, and third interferometric devices.

17. The method of claim 12, further comprising:
    connecting an output terminal of said second interferometric device to an input terminal of a fourth interferometric device having a wavelength separation capability of 2 $\Delta\lambda$;
    connecting an output terminal of said third interferometric device to an input terminal of a fifth interferometric device having a wavelength separation capability of 2 $\Delta\lambda$;
    connecting a first output terminal of said fourth interferometric device to an input terminal of a sixth interferometric device;

connecting a second output terminal of said fourth interferometric device to an input terminal of a seventh interferometric device;

connecting a first output terminal of said fifth interferometric device to an input terminal of an eighth interferometric device; and connecting a second output terminal of said fifth interferometric device to an input terminal of a ninth interferometric device, wherein said sixth, seventh, eighth, and ninth interferometric device have approximately the same wavelength separation capability as said fourth and fifth interferometric devices.

18. The method of claim 17, further comprising forming a single 1×4 WDM from said first, second, third, fourth, fifth, sixth, seventh, eighth, and ninth interferometric devices.

* * * * *